United States Patent
Duque

(10) Patent No.: US 12,348,638 B2
(45) Date of Patent: Jul. 1, 2025

(54) USING CRYPTOGRAPHIC TOKENS AND GAZE DETECTION FOR AUTHENTICATION

(71) Applicant: Capital One Services, LLC, McLean, VA (US)

(72) Inventor: Julian Duque, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 245 days.

(21) Appl. No.: 18/315,460

(22) Filed: May 10, 2023

(65) Prior Publication Data

US 2024/0380601 A1  Nov. 14, 2024

(51) Int. Cl.
| | |
|---|---|
| *H04L 9/08* | (2006.01) |
| *G06F 21/32* | (2013.01) |
| *H04L 9/00* | (2022.01) |
| *H04L 9/32* | (2006.01) |

(52) U.S. Cl.
CPC ............ *H04L 9/3231* (2013.01); *G06F 21/32* (2013.01); *H04L 9/3213* (2013.01)

(58) Field of Classification Search
CPC ... H04L 9/3231; H04L 9/3213; H04L 9/0866; H04L 9/3239; H04L 9/3297; H04L 9/50; G06F 21/32

See application file for complete search history.

(56) References Cited

U.S. PATENT DOCUMENTS

| | | | | |
|---|---|---|---|---|
| 2015/0135309 | A1* | 5/2015 | Karmarkar | G06F 16/532 726/19 |
| 2015/0227735 | A1* | 8/2015 | Chappell | G06F 3/013 726/19 |
| 2019/0222424 | A1* | 7/2019 | Lindemann | H04L 9/3297 |

OTHER PUBLICATIONS

Image Based Eye Gaze Tracking and Its Applications, by Anjith, published 2017. (Year: 2017).*
Real-time Eye Tracking for Password Authentication, by Sawant et al.; published 2019 (Year: 2019).*

* cited by examiner

*Primary Examiner* — Vu V Tran
(74) *Attorney, Agent, or Firm* — Foley & Lardner LLP

(57) ABSTRACT

Methods and systems are described herein for an authentication mechanism that uses cryptographic tokens and eye-tracking data. In particular, the disclosed mechanism may receive an authentication request that includes an identifier of a cryptographic token and retrieve eye-tracking data and an image associated with the cryptographic token. The eye-tracking data may store various coordinates within the image and may be encoded for use in authentication. The disclosed mechanism may then transmit the image to a computing device (e.g., associated with a user) that is able to perform gaze detection as part of an authentication operation. In response, the disclosed mechanism may receive user gaze data collected during the authentication operation and determine whether the eye-tracking data matches the user gaze data. Based on determining that the eye-tracking data matches the user gaze data, the disclosed mechanism may transmit to the computing device an indication of successful authentication.

20 Claims, 7 Drawing Sheets

200

| Field | Value |
|---|---|
| Request | Authenticate |
| Token ID | 0xBC4CA0EdA7647A8aB7C2061c2E118A18a936f13D:6007 |

FIG. 2

USING CRYPTOGRAPHIC TOKENS AND GAZE DETECTION FOR AUTHENTICATION

BACKGROUND

Various methods of authentication are currently available to users. Some less complex authentication systems such as usernames/passwords have been available for many decades now. More complex systems, such as biometric authentication systems, have become widely available over the last few years. However, many of these systems require complex storage implementations to store the data in such a way that the data is not compromised, and at the same time may be efficiently used for user authentication. To add to the complexity, many authentication systems need to be geographically dispersed. Accordingly, the storage implementations may need to be replicated to a multitude of geographical locations making these authentication systems even more complex and difficult to manage and maintain.

SUMMARY

One mechanism to solve the storage and authentication complexity may use blockchain technology in combination with eye-tracking/gaze detection to authenticate users. Blockchain technology solves the issue of having to replicate the data to different locations as blockchain nodes already exist in different locations around the world and the replication mechanism in the blockchain nodes may be used by any authentication system. Furthermore, eye-tracking/gaze detection enables difficult-to-break authentication without the need to use usernames/passwords or biometric authentication mechanisms. Therefore, methods and systems are described herein for performing authentication using eye-tracking in combination with cryptographic tokens.

In particular, the disclosed mechanism may receive an authentication request that includes an identifier of a cryptographic token and retrieve eye-tracking data and an image associated with the cryptographic token. The eye-tracking data may store various coordinates within the image and may be encoded for use in authentication. The disclosed mechanism may then transmit the image to a computing device (e.g., associated with a user) that is able to perform gaze detection as part of an authentication operation. In response, the disclosed mechanism may receive user gaze data collected during the authentication operation and determine whether the eye-tracking data matches the user gaze data. Based on determining that the eye-tracking data matches the user gaze data, the disclosed mechanism may transmit, to the computing device, an indication of successful authentication.

In some embodiments, this mechanism may be referred to as an authentication system. The authentication system may receive, from a computing device, an authentication request. The authentication request may include an identifier of a cryptographic token. Thus, the authentication system may use a cryptographic token for authenticating a user. For example, a user (e.g., using a smartphone, an electronic tablet, or another suitable computing device) may transmit an authentication request to authenticate access to an item (e.g., an audio file, an image, a video, and/or another suitable item). The cryptographic token may be a non-fungible token (NFT) or another suitable cryptographic token.

Based on the request the authentication system may retrieve, using the cryptographic token, eye-tracking data, and an image. The eye-tracking data may correspond to coordinates on the image. For example, the eye-tracking data may be encoded (e.g., hashed using a one-way hashing algorithm) such that the coordinates may not be read by a user. The eye-tracking data (e.g., the encoding) may be stored within the cryptographic token (e.g., on a blockchain hosting the cryptographic token). In some embodiments, the eye-tracking data may be stored outside of the cryptographic token and the cryptographic token may store a link to the eye-tracking data. The image may also be stored within the cryptographic token or outside of the cryptographic token such that a link to the image enables retrieval of the image. In both cases, the authentication system may retrieve the image and the eye-tracking data.

The authentication system may transmit the image to the computing device, such that the computing device performs an authentication operation using user gaze detection. For example, the authentication system may transmit, to the computing device, a command to perform gaze detection. The command may instruct the computing device to display the image (e.g., on the display of the computing device). The computing device may then instruct the user to look at different points within the image (e.g., in order) for authentication. The computing device may then detect the user's sequence of gazes and store that data and user gaze data. The computing device may then transmit the user gaze data to the authentication system. In some embodiments, the command may be formatted in a way that the computing device may interpret the command and display the correct image. In some embodiments, the command may, instead of transmitting the image, transmit a link to the image so that the computing device may retrieve the image.

The authentication system may then receive, from the computing device, user gaze data collected during the authentication operation. For example, the authentication system may receive the user gaze data as sets of coordinates. The coordinates may be encrypted (e.g., using a public key associated with a cryptography-based storage application on the computing device). In this instance, the authentication system may decrypt the coordinates using the public key associated with the computing device.

The authentication system may then determine whether the eye-tracking data matches the user gaze data. For example, the authentication system may decrypt the coordinates and then encode the coordinates using the same encoding system that was used to encode the eye-tracking data retrieved from the cryptographic token. When the coordinates have been encoded, the authentication system may perform a comparison of the encoded eye-tracking data and the encoded user gaze data.

In some instances, the user gaze data and the eye-tracking data may not be exact. For example, during gaze detection, the coordinates may be off because gaze detection is not fully accurate. Thus, the authentication system may still match the coordinates if they are not exact (e.g., off by ten percent or another suitable value). In particular, the authentication system may extract a first plurality of coordinates from the eye-tracking data and a second plurality of coordinates from the user gaze data. The authentication system may then compare the coordinates in order and determine whether the coordinates match. As discussed above, the coordinates may not be the same, but may still match as gaze detection may not be perfectly accurate.

In some embodiments, to solve the problem of inaccurate gaze detection, the authentication system may divide the image into a plurality of zones and may store the coordinates of a zone determined based on the gaze detection operation. In particular, the authentication system may divide the image into a plurality of zones and determine a corresponding zone of the plurality of zones for each coordinate set of a plurality of ordered coordinate sets within the eye-tracking data. The authentication system may then store an ordered list of zone identifiers in chronological order based on times when each coordinate set of the plurality of ordered coordinate sets was collected.

In some embodiments, the authentication system may use a color within the eye-tracking data and the user gaze data to determine whether the eye-tracking data and the user gaze data match. For example, each zone within an image may be assigned a color (e.g., based on an average color within that zone). The authentication system may then compare the colors when determining whether eye-tracking data and user gaze data match.

Based on determining that the eye-tracking data matches the user gaze data, the authentication system may transmit, to the computing device, an indication of successful authentication. In some embodiments, the indication may also include a token to access a particular item that the user requested access to. In yet some embodiments, the authentication system may transmit a link to the item or another suitable mechanism to access an item.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

BRIEF DESCRIPTION

FIG. 2 illustrates a data structure representing an authentication request, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
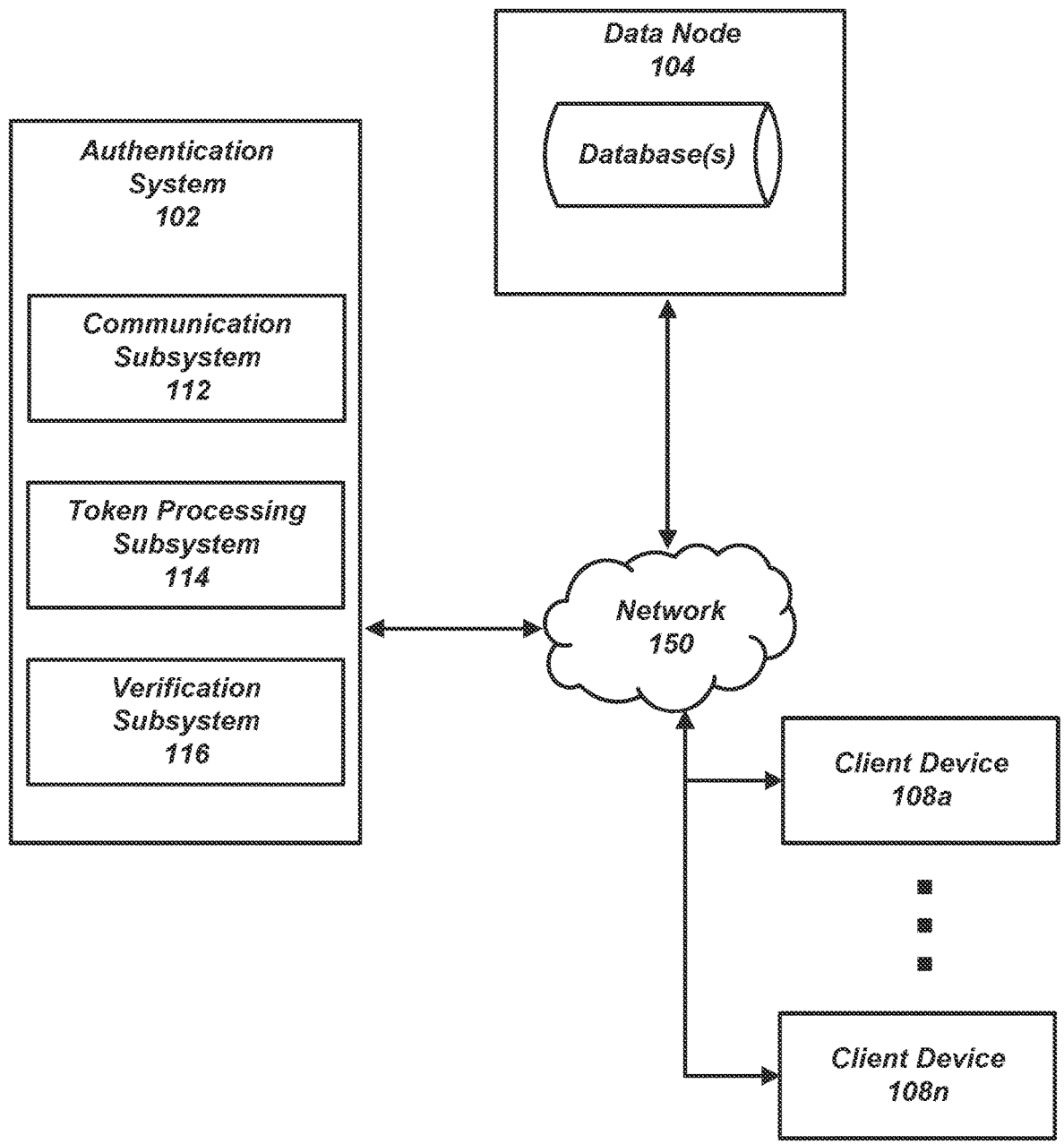
FIG. 1 shows an illustrative system for performing authentication using eye-tracking with cryptographic tokens, in accordance with one or more embodiments of this disclosure.

FIG. 1 is an example of environment 100 for performing authentication using eye-tracking with cryptographic tokens. Environment 100 includes authentication system 102, data node 104, and client devices 108a-108n. Client devices may sometimes be referred to as computing devices. Authentication system 102 may execute instructions for performing authentication using eye-tracking with cryptographic tokens. Authentication system 102 may include software, hardware, or a combination of the two. For example, authentication system 102 may be hosted on a physical server or a virtual server that is running on a physical computer system. In some embodiments, authentication system 102 may be configured on a user device (e.g., a laptop computer, a smartphone, a desktop computer, an electronic tablet, or another suitable user device). For example, authentication system 102 may be stored on a blockchain and may execute operations on a blockchain node, such as a computer or processor. Client devices 108a-108n may be computing devices (e.g., a laptop computer, a smartphone, a desktop computer, an electronic tablet, or another suitable user device) hosting cryptographic wallets (e.g., digital wallets). Cryptographic wallets may be referred to as cryptography-based storage applications. Each cryptography-based storage application may store one or more keys that enables the corresponding cryptography-based storage application to sign blockchain operations requests, thereby proving ownership/control of a particular cryptographic token (e.g., a non-fungible token) on a computer or another suitable user device (e.g., a smartphone, electronic tablet, etc.). A cryptographic token may be a token storing digital information (e.g., drawings, etc.) or value (e.g., monetary value), such as a fungible or non-fungible token. A cryptographic token may be written to a blockchain (e.g., minted on a blockchain) via a blockchain operation performed by a blockchain node.

Data node 104 may store various data, including user data, copies of on-chain programs, and/or other suitable data. Data node 104 may include software, hardware, or a combination of the two. For example, data node 104 may be a physical server or a virtual server that is running on a physical computer system. In some embodiments, authentication system 102 and data node 104 may reside on the same hardware and/or the same virtual server/computing device. Network 150 may be a local area network, a wide area network (e.g., the Internet), or a combination of the two.

Cryptography-based storage applications may include software, hardware, or a combination of the two. For example, each cryptography-based storage application may reside on a general-purpose computer or on a special device (e.g., a fob) intended for storing the cryptography-based storage application. For example, the device may store private keys in a memory of the device and allow transactions to be completed on the device itself. Examples of cryptography-based storage applications may include cryptographic wallets. Devices may include any suitable end-user computing devices (e.g., desktop computers, laptops, electronic tablets, smartphones, and/or other computing devices used by end users) capable of transmitting and receiving data such as requests and/or like transactions.

Authentication system 102 may receive, from a computing device, an authentication request. The authentication request may include an identifier of a cryptographic token. In some embodiments, authentication system 102 may receive the authentication request using communication subsystem 112. Communication subsystem 112 may include software components, hardware components, or a combination of both. For example, communication subsystem 112 may include a network card (e.g., a wireless network card and/or a wired network card) that is associated with software to drive the card. In some embodiments, communication subsystem 112 may receive the authentication request from a client device of client devices 108a-108n. For example, the authentication request may be a request to access an item. The item may be a file stored on a particular device (e.g., on data node 104). For example, a user may want to access an audio file (e.g., a song) from a client device of client devices 108a-108n. As discussed above, a client device is sometimes referred to as a computing device. Thus, to access the item, the client device may need to be authenticated first. As a result, the client device may transmit an authentication request to authentication system 102.

FIG. 2 illustrates a data structure 200 representing an authentication request. The authentication request may include fields 203 and values 206. The request field may indicate a request type (e.g., authenticate) in the corresponding value field and token ID field may indicate an identifier of the cryptographic token in the value field. Communication subsystem 112 may pass at least a portion of the data included in the authentication request to enable access to the item. In some embodiments, communication subsystem 112 may pass, to token processing subsystem 114, a pointer to the authentication request in memory.

Token processing subsystem 114 may include software components, hardware components, or a combination of both. For example, token processing subsystem 114 may include software components (e.g., API calls) that access and/or execute programs such as on-chain programs to generate or access cryptographic tokens (e.g., cryptographic tokens). Token processing subsystem 114 may retrieve, using the cryptographic token, eye-tracking data, and an image. The eye-tracking data may correspond to coordinates on the image. In some embodiments, the eye-tracking data may include multiple sets of ordered coordinates within the image. For example, the image may include a number of pixels such that each pixel may be identified by a horizontal coordinate and a vertical coordinate. Thus, if the image is 1000 pixels by 1000 pixels, the total number of pixels within the image may be 1,000,000.

Figure 3:
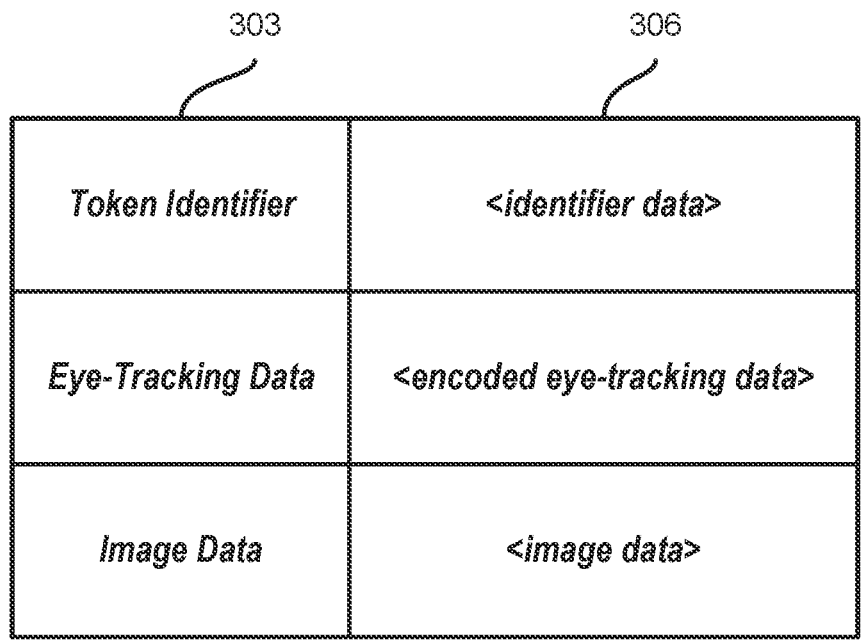
FIG. 3 illustrates a data structure representing a cryptographic token, in accordance with one or more embodiments of this disclosure.

FIG. 3 illustrates a data structure 300 representing a cryptographic token. Data structure 300 may include name fields 303 and value fields 306. Name fields 303 may include a token identifier field, an eye-tracking data field, and an image data field. Value fields 306 may include data corresponding to each name field. The token identifier field may be an identifier for the cryptographic token. The token identifier may have a value such as an unsigned integer value from 8 bits to 256 bits. The cryptographic token may also include eye-tracking data. The eye-tracking data may be in the form of one or more coordinate sets (e.g., coordinate pairs for a two-dimensional image). In some embodiments, the image may be a three-dimensional image, thus the coordinate set may include three coordinates. Furthermore, the eye-tracking data may include multiple sets of coordinates. For example, there may be five sets of coordinates corresponding to five different places the user looked within the image when the cryptographic token was being generated. In some embodiments, the eye-tracking data may be encoded (e.g., using one-way encoding such as hashing). The image data field may include an image that was used in generating the cryptographic token. The image may be a two-dimensional image, a three-dimensional image, or another suitable image.

In some embodiments, instead of storing the eye-tracking data and/or the image within the cryptographic token, that data may be stored on a remote device (e.g., on data node 104). Instead, the cryptographic token may store a uniform resource identifier (URI) so that the eye-tracking data and/or the image data may be retrieved from the remote location. The cryptographic token may store a single URI for both the eye-tracking data and the image data or two URIs: one URI for the eye-tracking data and one URI for the image data. In some embodiments, the eye-tracking data may be stored on the cryptographic token and the image data may be stored remotely.

When the image has been retrieved from the cryptographic token (or from a remote location associated with the URI), token processing subsystem 114 may transmit the image to the computing device. The computing device may perform an authentication operation using user gaze detection. For example, the computing device may include a camera and a display. The computing device may display the image on the display device and may initiate the authentication operation by instructing the user to start fixating on areas of the image in order. The computing device may also use a camera to perform gaze detection (e.g., each location within the image fixated by the user and a time period the user is fixating on each location). In some embodiments, gaze detection may include storing coordinate sets (e.g., a set of X-coordinates and Y-coordinates for two-dimensional images) indicating one or more locations on the image that the user fixated.

In some embodiments, the computing device may use visual and/or audio cues to prompt the user to initiate gaze detection. In particular, the computing device may prompt a user to perform an authentication operation, and then detect user gaze data that includes one or more ordered coordinate sets. In some embodiments, the computing device may prompt a user to fixate on one point at a time. For example, the prompt may indicate for the user to fixate on a first point. Subsequently (e.g., after a number of seconds), the computing device may prompt the user to fixate on a second point and/or ask the user whether the authentication operation is complete. When the user fixates on a particular point, the computing device may store the location within the gaze data. This may repeat until the user indicates that the authentication operation is complete. In some embodiments, the computing device may generate for display a three-dimensional (3D) image. In these embodiments, the computing device may store a location within a 3D space (e.g., one or more sets of X-coordinates, Y-coordinates, and Z-coordinates).

Token processing subsystem 114 may receive, from the computing device, user gaze data collected during the authentication operation. As discussed above, user gaze data may be one or more sets of coordinates representing locations on the image. In some embodiments, user gaze data may be an ordered plurality of areas within an image. For example, the image may be divided into a plurality of areas and when user gaze detection is performed, the area is detected (e.g., based on the location of the user's gaze). The area identifier is then stored as part of user gaze data. In some embodiments, the computing device may store one or more locations with the user gaze data and transmit those locations to authentication system 102. Authentication system 102 may convert the locations to areas based on a mapping. In some embodiments the mapping may be stored within the cryptographic token and/or may be part of metadata associated with the image.

Token processing subsystem 114 may pass the received user gaze data and the eye-tracking data to verification subsystem 116. Verification subsystem 116 may include hardware and/or software components. For example, verification subsystem 116 may use one or more processors to perform eye-tracking data and user gaze data comparisons. Verification subsystem 116 may determine whether the eye-tracking data matches the user gaze data. In some embodiments, verification subsystem 116 may make the determination by comparing ordered coordinate sets. Thus, verification subsystem 116 may determine whether a first plurality of ordered coordinate sets (e.g., corresponding to the eye-tracking data) matches a second plurality of ordered coordinate sets (e.g., corresponding to the user gaze data).

In some embodiments, verification subsystem 116 may perform the following operations to determine whether the eye-tracking data matches the user gaze data. Verification subsystem 116 may extract, from the eye-tracking data, a first plurality of ordered coordinate sets for a plurality of locations on the image. For example, the eye-tracking data may be stored within the cryptographic token. Thus, verification subsystem 116 may request and receive cryptographic token data from the blockchain and extract the eye-tracking data from the cryptographic token data. In some embodiments, the cryptographic token data may include the eye-tracking data in a particular field. In some embodiments, the eye-tracking data may be encoded in a particular format. One encoding format may be based on a hashing algorithm causing the encoding to be a hash. Another encoding format may involve encrypting the eye-tracking data using, for example, a public key associated with the user that controls the cryptographic token. This format would involve transmitting the encoded (e.g., encrypted) coordinates to the user's device to decrypt the data using the associated private key.

Verification subsystem 116 may also extract, from the user gaze data, a second plurality of ordered coordinate sets for the plurality of locations on the image. For example, when the computing device receives the image and the instructions to perform the authentication operation, the computing device may transmit the gaze data to verification subsystem 116. The received gaze data may have multiple fields for storing coordinates. For example, if five sets of coordinates were generated during gaze detection, there may be five fields in the gaze data. When verification subsystem 116 receives the gaze data, verification subsystem 116 may extract the ordered coordinate sets from the gaze data.

Verification subsystem 116 may then compare, in order, each coordinate set of the first plurality of ordered coordinate sets to a corresponding coordinate set within the second plurality of ordered coordinate sets. As gaze detection may not be very accurate in some devices (e.g., smartphone cameras), verification subsystem 116 may perform the following operations when performing the comparison. Verification subsystem 116 may iterate through each set of eye-tracking data and gaze detection data and compare corresponding coordinates to determine whether each coordinate set is with a threshold. Thus, verification subsystem 116 may determine that both a first vertical coordinate and a first horizontal coordinate of a first coordinate set of the first plurality of ordered coordinate sets is within a threshold value of a second vertical coordinate and a second horizontal coordinate of a second coordinate set of the second plurality of ordered coordinate sets. Verification subsystem 116 may perform this operation for all coordinate sets of eye-tracking data. In some embodiments, the threshold may be a percentage (e.g., five percent, ten percent, etc.), a number of pixels or another suitable threshold. If verification subsystem 116 determines that the coordinates within the first coordinate set are within the threshold of corresponding coordinates within the second coordinate set, verification subsystem 116 may determine that the first coordinate set matches the second coordinate set.

In some embodiments, verification subsystem 116 may perform the comparison and determine whether each coordinate set within the eye-tracking data matches each coordinate set within the gaze detection data. Thus, verification subsystem 116 may determine whether the eye-tracking data matches the user gaze data based on each coordinate set within the first plurality of ordered coordinate sets matching the corresponding coordinate set within the second plurality of ordered coordinate sets. For example, verification subsystem 116 may determine a number of coordinate sets within the eye-tracking data and a number of coordinate sets within the gaze detection data. If the numbers of coordinate sets do not match, the authentication will not succeed in this embodiment. Accordingly, verification subsystem 116 may determine that authentication has failed. If the numbers of coordinate sets do match, verification subsystem 116 may proceed to compare corresponding coordinate sets in turn. For example, verification subsystem 116 may compare a first set of coordinates within the eye-tracking data with a first set of coordinates within the gaze detection data. In particular, the coordinate sets may be stored in chronological order and, thus, verification subsystem 116 may compare the first sets of coordinates within the eye-tracking data and gaze detection data, respectively. If the coordinates within the coordinate sets match, verification subsystem 116 may move on to the second sets of respective coordinates. If verification of the first sets of coordinates fails, verification subsystem 116 may stop authentication and determine that authentication has failed. If the verification of the first sets of coordinates succeeds, verification subsystem 116 may continue iterating through the other coordinate sets.

When verification subsystem 116 iterates through all the coordinate sets and the coordinates match for all coordinate sets, verification subsystem 116 may determine that authentication is successful. Thus, based on determining that the eye-tracking data matches the user gaze data, verification subsystem 116 may transmit, to the computing device, an indication of successful authentication.

Prior to using the cryptographic token for authentication, authentication system 102 may cause the cryptographic token to be generated on a blockchain. In particular, authentication system 102 may receive, from the computing device associated with a cryptographic address (e.g., via communication subsystem 112), a token generation request to generate the cryptographic token. The token generation request may include the image and the eye-tracking data. In some embodiments, the cryptographic token may be used to control access to an item (e.g., an audio file, a visual file, or another suitable file). Furthermore, the eye-tracking data may include a plurality of ordered coordinate sets for a plurality of locations on the image. For example, a creator of an audio and/or video item (e.g., of a song, a movie, or another suitable item) may want to use the authentication system to enable access to that item. Thus, the creator may cause the cryptographic token to be generated by transmitting a token generation request to authentication system 102. For example, the creator may select an image for the cryptographic token and may instruct his or her user device to initiate an operation to generate eye-tracking data. The user device may display the selected image and may use an application together with, for example, a camera to record eye-tracking data (e.g., one or more sets of coordinates). As the user is gazing on different parts of the image, the user device may record the gaze data and transform the gaze data into eye-tracking data. In some embodiments, the transformation may be a hash function of each set of coordinates or another suitable transformation. The user device may transmit the gaze data or the eye-tracking data to authentication system 102.

Authentication system 102 may receive the gaze data or the eye-tracking data. If gaze data is received, authentication system 102 may transform the gaze data into eye-tracking data (e.g., using a hash function as described above or another suitable mechanism). The eye-tracking data may be provided to verification subsystem 116. Although the eye-tracking data and the gaze detection data are described as coordinates (e.g., coordinates within a two-dimensional image), other formats of eye-tracking and gaze detection data may be used. For example, 3D images may be used where the coordinates are within the 3D image (e.g., there are three coordinates representing each point within the 3D image). In some embodiments, the image may be a plurality of images. For example, certain Graphics Interchange Format (GIF) images may include a number of images or may be small videos. Thus, the coordinates may include an image identifier (e.g., an image number within the GIF together with two-dimensional or three-dimensional coordinates).

Verification subsystem 116 may encode the eye-tracking data and the image into a blockchain operation request. The blockchain operation request may cause generation of the cryptographic token with the eye-tracking data and the image. In some embodiments, the eye-tracking data is encoded into the cryptographic token using one-way encryption. That is, the eye-tracking data may be encoded for generating the cryptographic token using the eye-tracking data and the image. The cryptographic token may be controlled by a cryptography-based storage application that controls a particular cryptographic address (e.g., via a private key). The first plurality of coordinate sets is encoded using one-way encoding. For example, each coordinate set (or each coordinate) of the first plurality of coordinate sets may be hashed.

In some embodiments, encoding eye-tracking data and the image into a blockchain operation request may include formatting the blockchain operation request according to requirements from a blockchain node. For example, a particular blockchain may require that the data for the cryptographic token be encoded in a particular format. In some embodiments, the encoding operation may require encrypting the eye-tracking data and the image using a private key associated with a requestor. Thus, verification subsystem 116 may transmit that data to the requestor's device for encryption. The requestor's device may encrypt the data and transmit it back to verification subsystem 116 (e.g., via communication subsystem 112).

Verification subsystem 116 may then transmit (e.g., via communication subsystem 112) the blockchain operation request to a blockchain node. The blockchain node may generate the cryptographic token on a blockchain and may transmit an identifier of the cryptographic token to verification subsystem 116. In some embodiments, the identifier may be a cryptographic token address of the cryptographic token. Thus, verification subsystem 116 may use that cryptographic token address to control the cryptographic token (e.g., use that cryptographic token for authentication or transfer control of that cryptographic token to another user). In some embodiments, verification subsystem 116 may transmit the blockchain operation request to be executed by a particular smart control that is enabled to generate (e.g., mint) the cryptographic token (e.g., a non-fungible token).

When the cryptographic token is generated (e.g., with encoded eye-tracking data), the cryptographic token may be transferred to another person (e.g., to be controlled by another cryptographic address). For example, a creator of an item (e.g., a song, an image, a video, etc.) may want to transfer ownership (e.g., control) of the item to a person that acquired the item from the creator. Thus, authentication system 102 may receive (e.g., via communication subsystem 112) a token transfer request for transferring control of the cryptographic token to a different cryptographic address. In some embodiments, the token transfer request may include an identifier of the cryptographic token and/or an identifier of the item that is changing ownership. If the transfer request includes the identifier of the item without the identifier of the cryptographic token, authentication system 102 (e.g., via token processing subsystem 114) may determine the identifier of the cryptographic token based on the identifier of the item. For example, authentication system 102 may access (e.g., at data node 104) a table that stores a listing of items and corresponding cryptographic token identifiers.

In some embodiments, the token transfer request may include an address identifier of a cryptographic address that will control the cryptographic token after the transfer is completed. The address identifier may be a blockchain address (e.g., a wallet address of the user that will control the cryptographic token). In addition, the transfer request may include a device identifier associated with the device requesting the transfer. The device identifier may be a network address (e.g., an Internet address) associated with the user's device (e.g., the creator's device) that hosts a cryptography-based storage application that can control the cryptographic token.

Token processing subsystem 114 may then authenticate the token transfer request. For example, the token transfer request may include a cryptographic signature generated based on a private key associated with the cryptographic address that controls the cryptographic token. In some examples, the cryptographic signature may be referred to as a digital signature. The requestor may access, on the requestor's user device an associated cryptography-based storage application and may instruct the cryptography-based storage application to generate a digital signature using a private key of the cryptography-based storage application corresponding to the requestor. The digital signature may be verified by the token processing system using the public key of the same cryptography-based storage application. In some embodiments, the public key may correspond to an on-chain address associated with the requestor.

In some embodiments, to generate the cryptographic signature, a function (e.g., Rivest, Shamir, and Adleman (RSA) function) may be applied to a message (or the hash of a message) with the private key of the cryptography-based storage application of the requestor. The authentication system or any node of the blockchain may verify that the request is authorized by applying a function with the public key to the digital signature and comparing the result to the expected message (or the hash of the message). If the expected message and/or hash is equivalent to the result of applying the function, then the request is authentic. Any suitable functions and/or alternative digital signature schemes may be used, such as Probabilistic Signature Scheme (PSS) and/or the like.

When the request is authorized, token processing subsystem 114 may transmit the image (e.g., the image that was used to originally generate the authentication for the item) and an eye-tracking data generation request to a target computing device. The target computing device may prompt a different user to generate new eye-tracking data. The target computing device may also detect new user gaze data that includes a new plurality of ordered coordinate sets. That is, when token processing subsystem 114 authorizes the transfer request (e.g., by authenticating the request), token processing subsystem 114 may instruct a target device (e.g., a device controlled by the acquirer of the item) to generate new eye-tracking data for authenticating access to the item. The target device may host software and hardware that enables a new plurality of sets of coordinates to be generated. In some embodiments, the new eye-tracking data (e.g., the new plurality of sets of coordinates) may be received as part of the transfer request. Accordingly, token processing subsystem 114 may authenticate the request and use the received eye-tracking data without having to transmit a request to the target device for that data.

Figure 4:
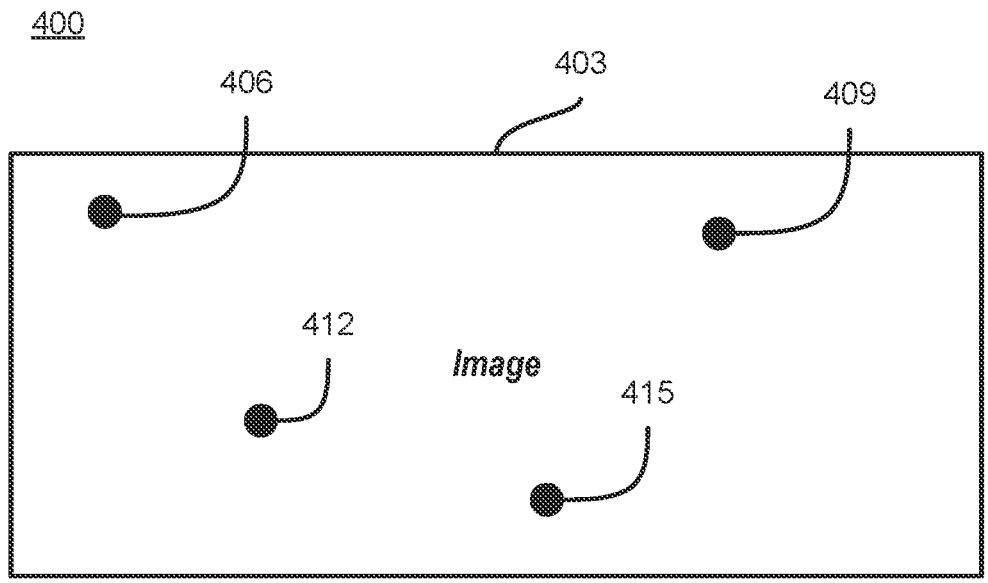
FIG. 4 illustrates using a coordinate system encoding for performing authentication, in accordance with one or more embodiments of this disclosure.

FIG. 4 illustrates the use of a coordinate system encoding for performing authentication. The encoding shown in FIG. 4 may be performed during the generation process for the cryptographic token when the cryptographic token is authenticated, and/or when control of the cryptographic token is transferred to another user (e.g., another cryptography-based storage application associated with a new pair of public and private keys). Screen 400 of FIG. 4 illustrates a plurality of locations that were detected using a gaze detection operation. For example, a user device may display the image 403 and use a camera or another suitable device to track the user's gaze. When the user's gaze stops at a particular location on the image for a threshold amount of time, the user device may detect (e.g., via a camera or another suitable device) where the user is gazing. The user device may then store that location (e.g., a set of coordinates) as a first location. In some embodiments, the user may only do this one time and have a single coordinate set. However, in some embodiments, the user device may repeat this process for a number of times to arrive at a plurality of coordinates. The number of times may be a predetermined number or a number selected by the user or the user device. In some embodiments, the number of coordinate sets may act as an authorization mechanism as it will only be known to the person who performed the operation. Thus, coordinates may be coordinates 406, 409, 412, and 415. In this instance, the gaze detection operation may have detected four coordinate sets. Code 420 indicates the coordinate sets in an unencoded form.

The user device or another suitable system may encode the coordinate sets so that they are not able to be read when the coordinates are part of a cryptographic token on a blockchain or when the coordinates are stored at a server and are linked to by a link within the cryptographic token. Encoding 430 illustrates such encoded coordinates. In some embodiments, the coordinate sets may be encoded using a hashing algorithm. For example, when gaze data is received (e.g., on a user device or at authentication system 102), the gaze data may be input into a hashing function and a hash may be stored. In some embodiments, the encoding may include encrypting either the hash data or the plurality of sets of coordinates. The encryption may be performed using a private key associated with the user that will control the cryptographic token.

To continue with the transfer operation, authentication system 102 (e.g., via communication subsystem 112) may receive the new plurality of ordered coordinate sets from the target computing device and may generate a new blockchain operation that (1) transfers control of the cryptographic token to the different cryptographic address and (2) updates the cryptographic token with the new plurality of ordered coordinate sets. That is, authentication system 102 may generate a request to a blockchain node to transfer control of the cryptographic token to another cryptographic address (e.g., associated with another cryptography-based storage application). The request may be formatted as required by the blockchain node of a blockchain (e.g., a request is formatted to be compatible with the blockchain protocol and may include a cryptographic signature). The request may also include the new eye-tracking data generated from the gaze data as described above.

Figure 5:
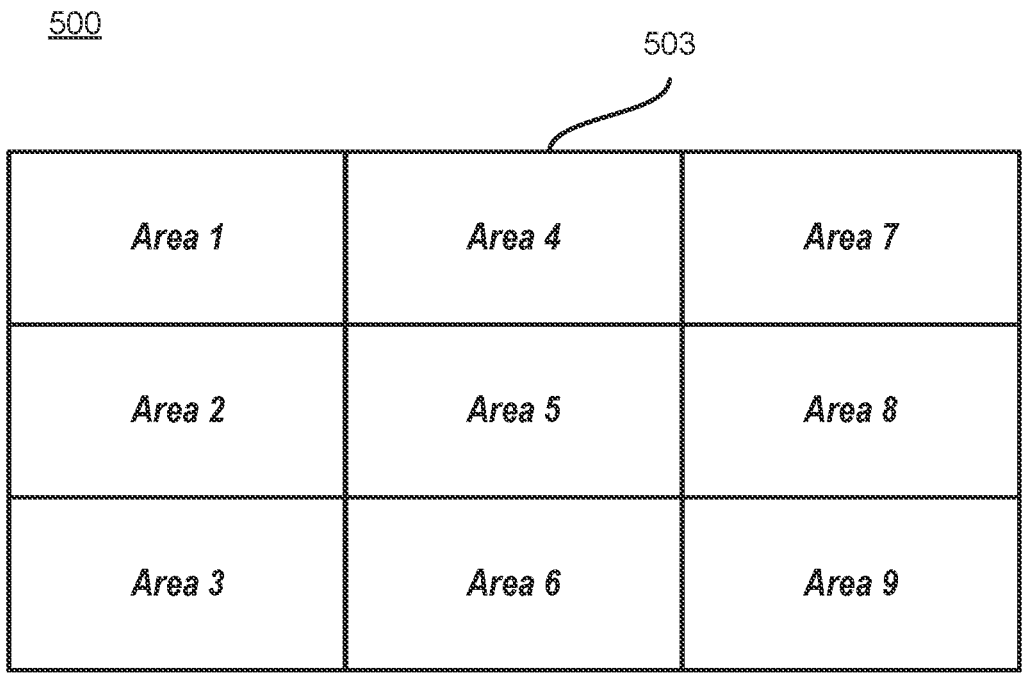
FIG. 5 illustrates use of zones within an image for authenticating a user, in accordance with one or more embodiments of this disclosure.

In some embodiments, the gaze detection data collection and/or encoding to authenticate or generate new eye-tracking data may be performed as described below. This operation may be performed on a user device (e.g., a client device of client devices 108a-108n), at a server device that hosts authentication system 102, or at data node 104. For example, encoding the eye-tracking data and the image into the blockchain operation request may include the following operations. Authentication system 102 may divide the image into a plurality of zones. The number of zones may be predetermined and/or based on a size of the image (e.g., the size of the image in pixels). FIG. 5 illustrates an image 500 divided in nine zones or areas 503.

When the gaze detection data or the eye-tracking data is available, authentication system 102 may determine a corresponding zone of the plurality of zones for each coordinate set of a plurality of ordered coordinate sets within the eye-tracking data or the gaze detection data. For example, authentication system 102 may iterate through each set of coordinates and determine within which zone or area the coordinates are located. When the zones or areas are identified, authentication system 102 may store an ordered list of zone identifiers in chronological order based on times when each coordinate set of the plurality of ordered coordinate sets was collected. Thus, code 520 illustrates the ordered list. In some embodiments, the ordered list may be encoded (e.g., as illustrated by encoding 530). The encoding operation may be performed as discussed above (e.g., using a hashing function and/or encryption).

In some embodiments, the zones may be used when generating the cryptographic token and collecting the gaze detection data to turn the gaze detection data into eye-tracking data. For example, a user device or another suitable device may receive the gaze detection data (e.g., a plurality of coordinate sets of an image) and determine a plurality of zones or areas for the gaze detection data (e.g., for each coordinate within the gaze detection data). If the gaze detection operation is part of an authentication operation, authentication system 102 may compare the encoded zone data with the eye-tracking data associated with the cryptographic token. If the gaze detection operation is part of the cryptographic token transfer operation, authentication system 102 may replace the current eye-tracking data with the encoded zone data.

In some embodiments, authentication system 102 may use colors of the image to generate eye-tracking data and gaze detection data. For example, when gaze detection is performed (e.g., when generating eye-detection data for token creation/token transfer, when collecting gaze detection data for comparison to eye-tracking data, etc.) the device performing gaze detection (e.g., a camera) may be unable to accurately track a person's eyes or accurately detect coordinates on the image upon which the user gazed. Thus, authentication system 102 may use color information within the image in the gaze detection process. For example, an image may include a plurality of pixels with each pixel having a particular color. When gaze detection is performed, the user device may store a point on the image (e.g., coordinates) and then determine the color at that point (e.g., the color of the pixel). The user device may then use the color of the point and the colors around the point to generate the gaze detection data. For example, the user device may average the color values around the detected point (e.g., pixel color values) to generate a first gaze detection value (e.g., to be used in authentication or in generation/transfer).

In some embodiments, the color information may be used in combination with the zone information when determining whether the eye-tracking data matches the user gaze data. For example, token processing subsystem 114 may generate, for a plurality of zones within the image, a corresponding color. Each color may represent an average color within a corresponding zone. For example, each pixel within a zone may have a corresponding Red/Green/Blue (RGB) value. Thus, token processing subsystem 114 may apply a function to all the pixel colors to arrive at a color that represents the particular zone. For example, an RGB value for baby blue may be 137, 207, or 240.

Token processing subsystem 114 may assign a first plurality of colors to a first plurality of coordinate sets within the eye-tracking data, based on each coordinate set of the first plurality of coordinate sets matching the corresponding zone. For example, token processing subsystem 114 may assign a corresponding color to each zone within the image. Thus, when a particular coordinate set (e.g., XY coordinates) is within a particular zone, the eye-tracking data may reflect the color associated with that zone. Token processing subsystem 114 may iterate through each coordinate set within the eye-tracking data and assign a corresponding color to each coordinate set. For example, if a particular coordinate set is within a first zone and the first zone is associated with baby blue, token processing subsystem 114 may assign baby blue to that coordinate set and/or assign the RGB value of baby blue to that coordinate set. In some embodiments, another color-coding system may be used (e.g., instead of RGB). Thus, token processing subsystem 114 may assign a value of baby blue according to the color-coding system used. Token processing subsystem 114 may then generate a data structure which stores an ordered listing of colors for the eye-tracking data according to the zone.

Token processing subsystem 114 may assign a second plurality of colors to a second plurality of coordinate sets within the user gaze detection data, based on each coordinate set within the second plurality of coordinate sets matching the corresponding zone. Token processing subsystem 114 may iterate through each coordinate set in the user gaze data and may determine a zone for each coordinate set. When the zone is determined, processing subsystem 114 may retrieve a color associated with each zone and assign a color to each coordinate set. Token processing subsystem 114 may then generate a data structure which stores an ordered listing for the gaze detection data of colors according to the zone.

Token processing subsystem 114 may then determine whether the first plurality of ordered coordinate sets matches the second plurality of ordered coordinate sets based on the first plurality of colors matching the second plurality of colors in order. For example, token processing subsystem 114 may iterate through each data structure and compare the corresponding colors based on the position within the data structures. Thus, the first color within the data structure storing colors for the eye-tracking data may be compared to the first color within the data structure storing colors for the gaze detection data. If all colors match, token processing subsystem 114 may determine that the coordinate sets match each other.

Computing Environment

Figure 6:
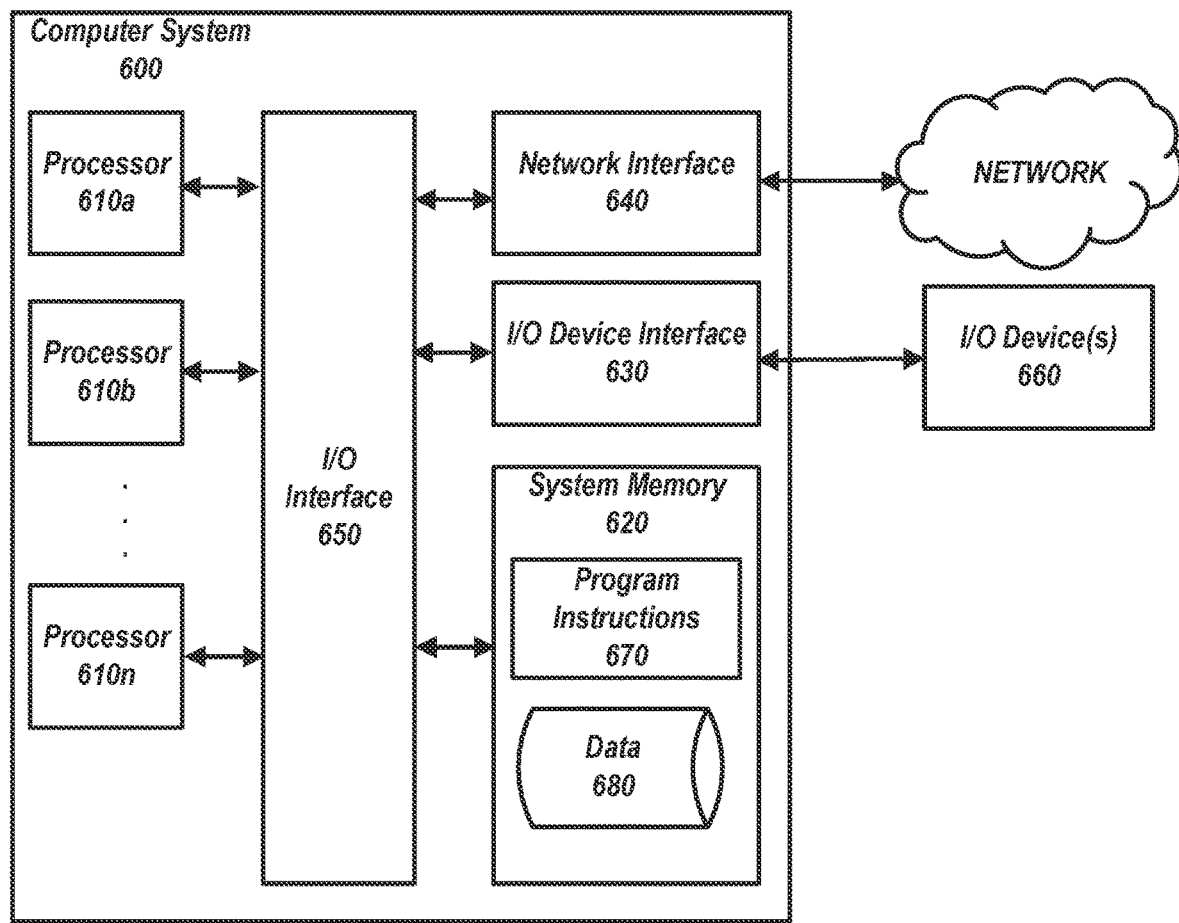
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for the connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions 670 may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory, computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
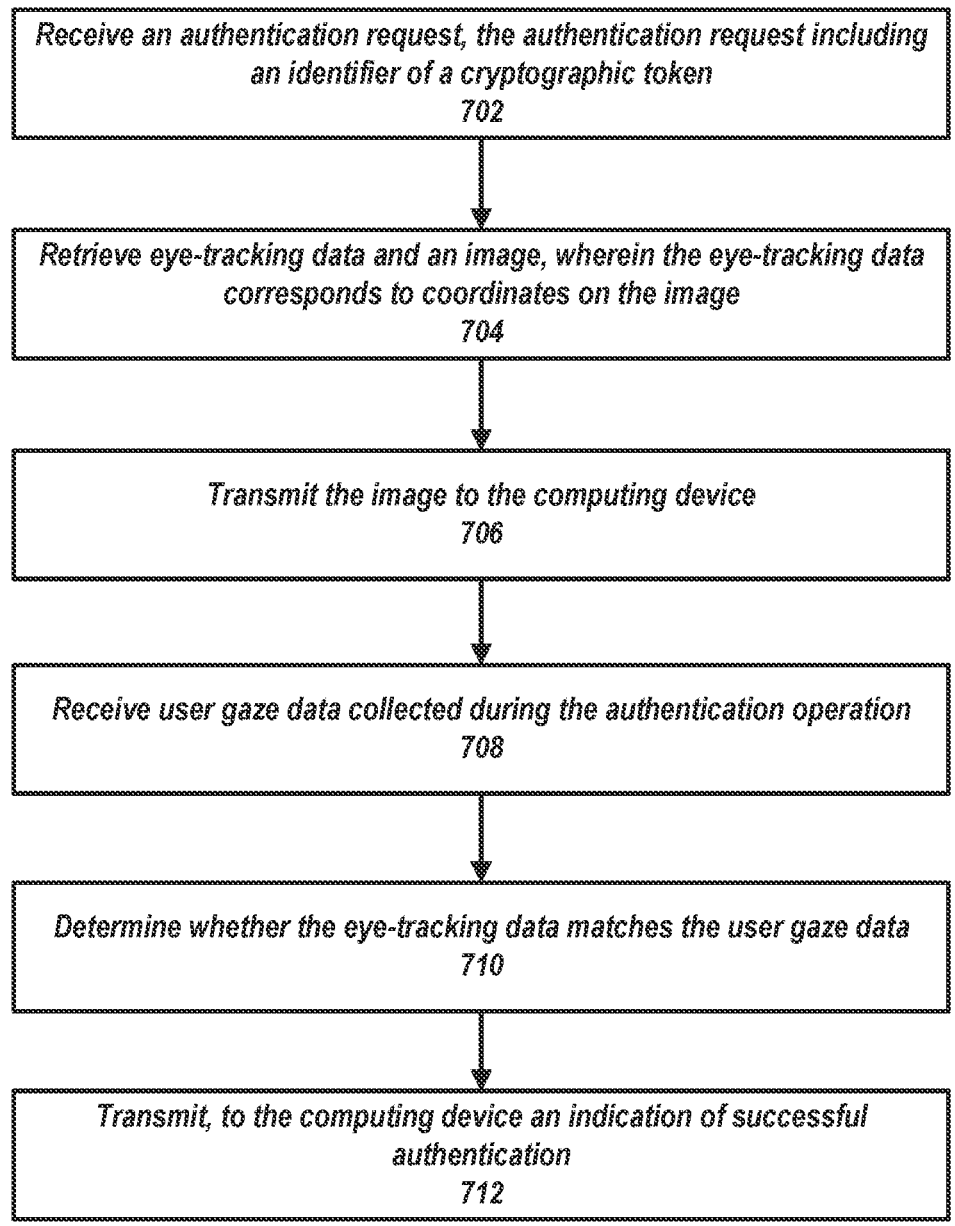
FIG. 7 is a flowchart of operations for performing authentication using eye-tracking with cryptographic tokens, in accordance with one or more embodiments of this disclosure.

FIG. 7 is a flowchart 700 of operations for enabling users to access user data of other users using generated non-fungible tokens that store access parameters. The operations of FIG. 7 may use components described in relation to FIG. 6. In some embodiments, authentication system 102 may include one or more components of computer system 600. At 702, authentication system 102 receives an authentication request, the authentication request including an identifier of a cryptographic token. For example, the authentication system 102 may receive the authentication request data from a client device, such as one of client devices 108a-108n. Authentication system 102 may receive the request over network 150. The authentication request may include an identifier of a cryptographic token. Thus, the authentication system may use a cryptographic token for authenticating a user. For example, a user (e.g., using a smartphone, an electronic tablet, or another suitable computing device) may transmit an authentication request to authenticate access to an item (e.g., an audio file, an image, a video, and/or another suitable item). The cryptographic token may be a non-fungible token (NFT) or another suitable cryptographic token.

At 704, authentication system 102 retrieves eye-tracking data and an image, wherein the eye-tracking data corresponds to coordinates on the image. Authentication system 102 may use one or more processors 610a, 610b, and/or 610n to retrieve the eye-tracking data from, for example, a cryptographic token stored on a blockchain. The retrieval operation may be performed over network 150. In some embodiments, the retrieval operation may follow a link stored within the cryptographic token. The eye-tracking data may correspond to coordinates on the image. For example, the eye-tracking data may be encoded (e.g., hashed using a one-way hashing algorithm) such that the coordinates may not be read by a user. The eye-tracking data (e.g., the encoding) may be stored within the cryptographic token (e.g., on a blockchain hosting the cryptographic token). In some embodiments, the eye-tracking data may be stored outside of the cryptographic token and the cryptographic token may store a link to the eye-tracking data. The image may also be stored within the cryptographic token or outside of the cryptographic token such that a link to the image enables retrieval of the image. In both cases, the authentication system may retrieve the image and the eye-tracking data.

At 706, authentication system 102 transmits the image to the computing device. For example, the authentication system 102 may transmit the image to a client device of client devices 108a-108n. The image may be transmitted with a command to perform gaze detection and respond with the results of gaze detection. For example, the authentication system may transmit, to the computing device, a command to perform gaze detection. The command may instruct the computing device to display the image (e.g., on the display of the computing device). The computing device may then instruct the user to look at different points within the image (e.g., in order) for authentication. The computing device may then detect the user's sequence of gazes and store that data and user gaze data. The computing device may then transmit the user gaze data to the authentication system. In some embodiments, the command may be formatted in a way that the computing device may interpret the command and display the correct image. In some embodiments, the command may, instead of transmitting the image, transmit a link to the image so that the computing device may retrieve the image.

At 708, authentication system 102 receives user gaze data collected during the authentication operation. The user gaze data may be received from a client device of client devices 108a-108n and stored in memory (e.g., system memory 620). Authentication system 102 may use one or more processors 610a, 610b, and/or 610n to perform this operation. For example, the authentication system may receive the user gaze data as sets of coordinates. The coordinates may be encrypted (e.g., using a public key associated with a cryptography-based storage application on the computing device). In this instance, the authentication system may decrypt the coordinates using the public key associated with the computing device.

At 710, authentication system 102 determines whether the eye-tracking data matches the user gaze data. Authentication system 102 may use one or more processors 610a, 610b, and/or 610n to perform this operation and may store the results in system memory 620. For example, the authentication system may decrypt the coordinates and then encode the coordinates using the same encoding system that was used to encode the eye-tracking data retrieved from the cryptographic token. When the coordinates have been encoded, the authentication system may perform a comparison of the encoded eye-tracking data and the encoded user gaze data.

At 712, authentication system 102 transmits, to the computing device an indication of successful authentication. Authentication system 102 may use network interface 640 to transmit the indication over network 150 to one of client devices 108a-108n. In some embodiments, the indication may also include a token to access a particular item that the user requested access to. In yet some embodiments, the authentication system may transmit a link to the item or another suitable mechanism to access an item.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method receiving, from a computing device, an authentication request, the authentication request comprising an identifier of a cryptographic token; retrieving, using the cryptographic token, eye-tracking data and an image, wherein the eye-tracking data corresponds to coordinates on the image; transmitting the image to the computing device, wherein the computing device performs an authentication operation using user gaze detection; receiving, from the computing device, user gaze data collected during the authentication operation; determining whether the eye-tracking data matches the user gaze data; and based on determining that the eye-tracking data matches the user gaze data, transmitting, to the computing device, an indication of successful authentication.

2. Any of the preceding embodiments, wherein determining whether the eye-tracking data matches the user gaze data further comprises: extracting, from the eye-tracking data, a first plurality of ordered coordinate sets for a plurality of locations on the image; extracting, from the user gaze data, a second plurality of ordered coordinate sets for the plurality of locations on the image; comparing, in order, each coordinate set of the first plurality of ordered coordinate sets to a corresponding coordinate set within the second plurality of ordered coordinate sets; and determining whether the eye-tracking data matches the user gaze data based on each coordinate set within the first plurality of ordered coordinate sets matching the corresponding coordinate set within the second plurality of ordered coordinate sets.

3. Any of the preceding embodiments, wherein comparing, in order, each coordinate set of the first plurality of ordered coordinate sets to the corresponding coordinate set within the second plurality of ordered coordinate sets comprises: determining that both a first vertical coordinate and a first horizontal coordinate of a first coordinate set of the first plurality of ordered coordinate sets is within a threshold value of a second vertical coordinate and a second horizontal coordinate of a second coordinate set of the second plurality of ordered coordinate sets; and determining that the first coordinate set matches the second coordinate set.

4. Any of the preceding embodiments, further comprising: receiving, from the computing device associated with a cryptographic address, a token generation request to generate the cryptographic token, wherein the token generation request comprises the image and the eye-tracking data; encoding the eye-tracking data and the image into a blockchain operation request, for generating the cryptographic token with the eye-tracking data and the image, wherein the eye-tracking data is encoded into the cryptographic token using one-way encryption; and transmitting the blockchain operation request to a blockchain node, wherein the blockchain node generates the cryptographic token on a blockchain.

5. Any of the preceding embodiments, wherein encoding the eye-tracking data and the image into the blockchain operation request comprises: dividing the image into a plurality of zones; determining a corresponding zone of the plurality of zones for each coordinate set of a plurality of ordered coordinate sets within the eye-tracking data; and storing an ordered list of zone identifiers in chronological order based on times when each coordinate set of the plurality of ordered coordinate sets was collected.

6. Any of the proceeding embodiments, further comprising: receiving a token transfer request for transferring control of the cryptographic token to a different cryptographic address; authenticating the token transfer request; transmitting the image and an eye-tracking data generation request to a target computing device, wherein the target computing device prompts a different user to generate new eye-tracking data, and wherein the target computing device detects new user gaze data comprising a new plurality of ordered coordinate sets; receiving the new plurality of ordered coordinate sets from the target computing device; and generating a new blockchain operation that (1) transfers control of the cryptographic token to the different cryptographic address and (2) updates the cryptographic token with the new plurality of ordered coordinate sets.

7. Any of the preceding embodiments, wherein determining whether the eye-tracking data matches the user gaze data further comprises: generating, for a plurality of zones within the image, a corresponding color, wherein each color represents an average color within a corresponding zone; assigning a first plurality of colors to a first plurality of coordinate sets within the eye-tracking data, based on each coordinate set of the first plurality of coordinate sets matching the corresponding zone; assigning a second plurality of colors to a second plurality of coordinate sets within the user gaze data, based on each coordinate set within the second plurality of coordinate sets matching the corresponding zone; and determining whether the first plurality of ordered coordinate sets matches the second plurality of ordered coordinate sets based on the first plurality of colors matching the second plurality of colors in order.

8. Any of the preceding embodiments, wherein retrieving, using the cryptographic token, the eye-tracking data further comprises retrieving a plurality of ordered coordinate sets, wherein each coordinate is encoded using a one-way encoding algorithm.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for performing authentication using eye-tracking with cryptographic tokens, the system comprising:
one or more processors; and
one or more non-transitory, computer-readable storage media storing instructions that when executed by the one or more processors cause the one or more processors to perform operations comprising:
receiving, from a computing device associated with a cryptographic address, a token generation request to generate a cryptographic token for controlling access to an item, wherein the token generation request comprises an image and eye-tracking data, and wherein the eye-tracking data comprises a first plurality of ordered coordinate sets for a plurality of locations on the image;
encoding the first plurality of ordered coordinate sets and the image into a blockchain operation request, for generating the cryptographic token using the eye-tracking data and the image, wherein the cryptographic token is controlled by the cryptographic address, and wherein the first plurality of coordinate sets is encoded using one-way encoding;
transmitting the blockchain operation request to a blockchain node, wherein the blockchain node generates the cryptographic token on a blockchain;
receiving, from the computing device, a token authentication request for accessing the item, the token authentication request comprising an identifier of the cryptographic token;
retrieving, from the cryptographic token, the image and the first plurality of ordered coordinate sets;
transmitting the image to the computing device, wherein the computing device prompts a user to perform an authentication operation, and wherein the computing device detects user gaze data comprising a second plurality of ordered coordinate sets;
determining whether the first plurality of ordered coordinate sets matches the second plurality of ordered coordinate sets; and
based on determining that the first plurality of coordinate sets matches the second plurality of coordinate sets, transmitting, to the computing device, to access the item.

2. The system of claim 1, wherein the instructions further cause the one or more processors to perform operations comprising:
receiving a token transfer request for transferring control of the cryptographic token to a different cryptographic address;
authenticating the token transfer request;
transmitting the image and an eye-tracking data generation request to a target computing device, wherein the target computing device prompts a different user to generate new eye-tracking data, and wherein the target computing device detects new user gaze data comprising a new plurality of ordered coordinate sets;
receiving the new plurality of ordered coordinate sets from the target computing device; and
generating a new blockchain operation that (1) transfers control of the cryptographic token to the different cryptographic address and (2) updates the cryptographic token with the new plurality of ordered coordinate sets.

3. The system of claim 1, wherein encoding the first plurality of ordered coordinate sets and the image into the blockchain operation request comprises:
dividing the image into a plurality of zones;
determining a corresponding zone of the plurality of zones for each coordinate set of the first plurality of ordered coordinate sets; and
storing an ordered list of zone identifiers in chronological order based on times when each coordinate set of the first plurality of ordered coordinate sets was collected.

4. The system of claim 1, wherein the instructions for determining whether the first plurality of ordered coordinate sets matches the second plurality of ordered coordinate sets further cause the one or more processors to perform operations comprising:
generating, for a plurality of zones within the image, a corresponding color, wherein each color represents an average color within a corresponding zone;
assigning a first plurality of colors to the first plurality of coordinate sets, based on each coordinate set of the first plurality of coordinate sets matching the corresponding zone;
assigning a second plurality of colors to the second plurality of coordinate sets, based on each coordinate set within the second plurality of coordinate sets matching the corresponding zone; and
determining whether the first plurality of ordered coordinate sets matches the second plurality of ordered coordinate sets based on the first plurality of colors matching the second plurality of colors in order.

5. A method comprising:
receiving, from a computing device, an authentication request, the authentication request comprising an identifier of a cryptographic token, wherein the cryptographic token is generated based on a token generation request that encodes eye-tracking data comprising coordinates for one or more locations on an image;
retrieving, using the cryptographic token, the eye-tracking data and the image;
transmitting the image to the computing device, wherein the computing device performs an authentication operation using user gaze detection;
receiving, from the computing device, user gaze data collected during the authentication operation;
determining whether the eye-tracking data matches the user gaze data; and
based on determining that the eye-tracking data matches the user gaze data, transmitting, to the computing device, an indication of successful authentication.

6. The method of claim 5, wherein determining whether the eye-tracking data matches the user gaze data further comprises:
extracting, from the eye-tracking data, a first plurality of ordered coordinate sets for a plurality of locations on the image;
extracting, from the user gaze data, a second plurality of ordered coordinate sets for the plurality of locations on the image;
comparing, in order, each coordinate set of the first plurality of ordered coordinate sets to a corresponding coordinate set within the second plurality of ordered coordinate sets; and
determining whether the eye-tracking data matches the user gaze data based on each coordinate set within the first plurality of ordered coordinate sets matching the corresponding coordinate set within the second plurality of ordered coordinate sets.

7. The method of claim 6, wherein comparing, in order, each coordinate set of the first plurality of ordered coordinate sets to the corresponding coordinate set within the second plurality of ordered coordinate sets comprises:
determining that both a first vertical coordinate and a first horizontal coordinate of a first coordinate set of the first plurality of ordered coordinate sets is within a threshold value of a second vertical coordinate and a second horizontal coordinate of a second coordinate set of the second plurality of ordered coordinate sets; and
determining that the first coordinate set matches the second coordinate set.

8. The method of claim 5, further comprising:
receiving, from at least one computing device associated with a cryptographic address, the token generation request to generate the cryptographic token;
encoding, using one way-encryption, the eye-tracking data and the image into a blockchain operation request for generating the cryptographic token with the eye-tracking data and the image; and
transmitting the blockchain operation request to a blockchain node, wherein the blockchain node generates the cryptographic token on a blockchain.

9. The method of claim 8, wherein encoding the eye-tracking data and the image into the blockchain operation request comprises:
dividing the image into a plurality of zones;
determining a corresponding zone of the plurality of zones for each coordinate set of a plurality of ordered coordinate sets within the eye-tracking data; and
storing an ordered list of zone identifiers in chronological order based on times when each coordinate set of the plurality of ordered coordinate sets was collected.

10. The method of claim 8, further comprising:
receiving a token transfer request for transferring control of the cryptographic token to a different cryptographic address different from the cryptographic address;
authenticating the token transfer request;
transmitting the image and an eye-tracking data generation request to a target computing device, wherein the target computing device prompts a different user to generate new eye-tracking data, and wherein the target computing device detects new user gaze data comprising a new plurality of ordered coordinate sets;
receiving the new plurality of ordered coordinate sets from the target computing device; and
generating a new blockchain operation that (1) transfers control of the cryptographic token to the different cryptographic address and (2) updates the cryptographic token with the new plurality of ordered coordinate sets.

11. The method of claim 5, wherein determining whether the eye-tracking data matches the user gaze data further comprises:
generating, for a plurality of zones within the image, a corresponding color, wherein each color represents an average color within a corresponding zone;

assigning a first plurality of colors to a first plurality of coordinate sets within the eye-tracking data, based on each coordinate set of the first plurality of coordinate sets matching the corresponding zone;

assigning a second plurality of colors to a second plurality of coordinate sets within the user gaze data, based on each coordinate set within the second plurality of coordinate sets matching the corresponding zone; and determining whether the first plurality of coordinate sets matches the second plurality of coordinate sets based on the first plurality of colors matching the second plurality of colors in order.

12. The method of claim 5, wherein retrieving, using the cryptographic token, the eye-tracking data further comprises retrieving a plurality of ordered coordinate sets, wherein each coordinate is encoded using a one-way encoding algorithm.

13. One or more non-transitory, computer-readable storage media storing instructions that when executed by one or more processors cause the one or more processors to perform operations comprising:

receiving from a computing device an authentication request, the authentication request comprising an identifier of a cryptographic token, wherein the cryptographic token is generated based on a token generation request that encodes eye-tracking data comprising coordinates for one or more locations on an image;

retrieving, from the cryptographic token, the eye-tracking data;

transmitting the image to the computing device for performing an authentication operation using user gaze detection;

receiving, from the computing device, user gaze data collected during the authentication operation;

determining whether the eye-tracking data matches the user gaze data; and based on determining that the eye-tracking data matches the user gaze data, transmitting, to the computing device an indication of successful authentication.

14. The one or more non-transitory, computer-readable storage media of claim 13, wherein the instructions for determining whether the eye-tracking data matches the user gaze data further cause the one or more processors to perform operations comprising:

extracting, from the eye-tracking data, a first plurality of ordered coordinate sets for a plurality of locations on the image;

extracting, from the user gaze data, a second plurality of ordered coordinate sets for the plurality of locations on the image;

comparing, in order, each coordinate set of the first plurality of ordered coordinate sets to a corresponding coordinate set within the second plurality of ordered coordinate sets; and determining whether the eye-tracking data matches the user gaze data based on each coordinate set within the first plurality of ordered coordinate sets matching the corresponding coordinate set within the second plurality of ordered coordinate sets.

15. The one or more non-transitory, computer-readable storage media of claim 14, wherein the instructions for comparing, in order, each coordinate set of the first plurality of ordered coordinate sets to the corresponding coordinate set within the second plurality of ordered coordinate sets further cause the one or more processors to perform operations comprising:

determining that both a first vertical coordinate and a first horizontal coordinate of a first coordinate set of the first plurality of ordered coordinate sets is within a threshold value of a second vertical coordinate and a second horizontal coordinate of a second coordinate set of the second plurality of ordered coordinate sets; and determining that the first coordinate set matches the second coordinate set.

16. The one or more non-transitory, computer-readable storage media of claim 13, wherein the instructions further cause the one or more processors to perform operations comprising:

receiving, from at least one computing device associated with a cryptographic address, the token generation request to generate the cryptographic token;

encoding, using one-way encryption, the eye-tracking data and the image into a blockchain operation request, for generating the cryptographic token with the eye-tracking data and the image; and transmitting the blockchain operation request to a blockchain node, wherein the blockchain node generates the cryptographic token on a blockchain.

17. The one or more non-transitory, computer-readable storage media of claim 16, wherein the instructions for encoding the eye-tracking data and the image into the blockchain operation request further cause the one or more processors to perform operations comprising:

dividing the image into a plurality of zones;

determining a corresponding zone of the plurality of zones for each coordinate set of a plurality of ordered coordinate sets within the eye-tracking data; and storing an ordered list of zone identifiers in chronological order based on times when each coordinate set of the plurality of ordered coordinate sets was collected.

18. The one or more non-transitory, computer-readable storage media of claim 13, wherein the instructions further cause the one or more processors to perform operations comprising:

receiving a token transfer request for transferring control of the cryptographic token to a different cryptographic address;

authenticating the token transfer request;

transmitting the image and an eye-tracking data generation request to a target computing device, wherein the target computing device prompts a different user to generate new eye-tracking data, and wherein the target computing device detects new user gaze data comprising a new plurality of ordered coordinate sets;

receiving the new plurality of ordered coordinate sets from the target computing device; and generating a new blockchain operation that (1) transfers control of the cryptographic token to the different cryptographic address and (2) updates the cryptographic token with the new plurality of ordered coordinate sets.

19. The one or more non-transitory, computer-readable storage media of claim 13, wherein the instructions for determining whether the eye-tracking data matches the user gaze data further cause the one or more processors to perform operations comprising:

generating, for a plurality of zones within the image, a corresponding color, wherein each color represents an average color within a corresponding zone;

assigning a first plurality of colors to a first plurality of coordinate sets within the eye-tracking data, based on each coordinate set of the first plurality of coordinate sets matching the corresponding zone;

assigning a second plurality of colors to a second plurality of coordinate sets within the user gaze data, based on each coordinate set within the second plurality of coordinate sets matching the corresponding zone; and determining whether the first plurality of coordinate sets matches the second plurality of coordinate sets based on the first plurality of colors matching the second plurality of colors in order.

20. The one or more non-transitory, computer-readable storage media of claim 13, wherein the instructions for retrieving, using the cryptographic token, the eye-tracking data further cause the one or more processors to retrieve a plurality of ordered coordinate sets, wherein each coordinate is encoded using a one-way encoding algorithm.

\* \* \* \* \*